United States Patent
Muenter

(10) Patent No.: US 7,075,700 B2
(45) Date of Patent: Jul. 11, 2006

(54) MIRROR ACTUATOR POSITION SENSOR SYSTEMS AND METHODS

(75) Inventor: Steven E. Muenter, Van Nuys, CA (US)

(73) Assignee: The Boeing Company, Chicago, IL (US)

( * ) Notice: Subject to any disclaimer, the term of this patent is extended or adjusted under 35 U.S.C. 154(b) by 13 days.

(21) Appl. No.: 10/877,592

(22) Filed: Jun. 25, 2004

(65) Prior Publication Data

US 2005/0286111 A1    Dec. 29, 2005

(51) Int. Cl.
*G02B 26/00* (2006.01)
*G02B 26/02* (2006.01)

(52) U.S. Cl. ...................... 359/291; 359/231
(58) Field of Classification Search ........ 359/231, 359/290, 291, 295, 298
See application file for complete search history.

(56) References Cited

U.S. PATENT DOCUMENTS

| | | | |
|---|---|---|---|
| 5,036,286 A * | 7/1991 | Holm-Kennedy et al. | 324/661 |
| 6,441,449 B1 | 8/2002 | Xu et al. | 257/414 |
| 6,480,645 B1 * | 11/2002 | Peale et al. | 385/18 |
| 6,625,341 B1 * | 9/2003 | Novotny | 385/18 |
| 6,985,271 B1 * | 1/2006 | Yazdi et al. | 359/214 |
| 2003/0174376 A1 * | 9/2003 | Sane et al. | 359/237 |

OTHER PUBLICATIONS

Trey Roessig et al., "Mirrors with Integrated Position Sense Electronics for Optical-Switching Applications" (Analog Dialogue, vol. 36, No. 4, Jul.-Aug. 2002).

* cited by examiner

*Primary Examiner*—Ricky Mack
*Assistant Examiner*—William Choi
(74) *Attorney, Agent, or Firm*—MacPherson Kwok Chen & Heid LLP; Greg J. Michelson

(57) ABSTRACT

Systems and methods are disclosed herein to provide position information, such as for example via a mirror actuator position sensor. For example, in accordance with an embodiment of the present invention, a mirror actuator is disclosed which utilizes its own capacitance to directly sense and provide mirror position information. The mirror position information may be utilized as a position feedback signal to assist in controlling a position of the mirror.

20 Claims, 3 Drawing Sheets

MIRROR ACTUATOR POSITION SENSOR SYSTEMS AND METHODS

TECHNICAL FIELD

The present invention relates generally to position sensors and, more particularly, to mirror position sensors, such as for micro-electro-mechanical system devices.

BACKGROUND

Micro-electro-mechanical system (MEMS) membrane-type mirrors are well known and may be employed as an economical alternative to conventional deformable mirrors, which for example may utilize PZT (lead zirconium titanate) or PMN (lead magnesium niobate) actuator types. MEMS actuators generally utilize electrostatic attraction to deform the shape of the membrane mirror in a controllable manner. However, in contrast to PZT or PMN actuators, the relationship between the applied voltage and the membrane position with an electrostatic actuator is nonlinear.

For MEMS membrane-type mirrors, if the applied voltage is increased beyond a certain value, the electrostatic attraction exceeds the membrane's restoring force, which typically results in a condition referred to as "snap down." When the membrane comes in contact with the underlying electrical plate (during the snap down event), the resulting spark discharge usually causes the rupture of the membrane. Consequently, to reduce the possibility of snap down, the maximum possible voltage to the actuator is generally limited to a safe value. However, one drawback of this limitation is that the speed and stroke of the actuator is reduced, resulting in a reduced bandwidth or a reduction in wavefront correction capability.

Another difference is that the "stiffness" of the electrostatic actuator may be less than PZT or PMN actuators. For example with PZT or PMN actuators, it may be assumed that actuator position is directly proportional to the applied voltage, regardless of any perturbing forces. With electrostatic actuators, the lack of stiffness may result in a greater position error due to perturbing forces, such as for example mirror membrane vibration or adjacent actuator cross-coupling. Position feedback sensing of the membrane is generally required to compensate for the inherent nonlinearity and lack of stiffness associated with the electrostatic actuators. The position feedback sensing is typically performed optically by using interferometers or wavefront sensors that are often expensive and prone to alignment problems. As a result, there is a need for improved techniques for position feedback sensors, such as for example for the MEMS membrane-type mirrors.

SUMMARY

Systems and methods are disclosed herein to provide position information, such as to provide mirror position information (e.g., provide MEMS mirror membrane position information). For example, in accordance with an embodiment of the present invention, a mirror actuator is disclosed which utilizes its own capacitance to directly sense and provide mirror position information (e.g., a mirror actuator position sensor). The mirror position information may be utilized as a position feedback signal to assist in controlling a position of the mirror. Consequently, an electronic solution may be provided for mirror control, which may provide certain advantages over conventional techniques (e.g., optical).

More specifically, in accordance with one embodiment of the present invention, a mirror system includes a mirror; and a mirror actuator circuit having an electrode to control a position of the mirror, wherein a capacitance between the electrode and the mirror is measured to determine a position of the mirror. For example, the mirror system may include a voltage source to provide a controllable electrostatic force via the electrode to influence the mirror position.

In accordance with another embodiment of the present invention, a mirror actuator system includes a mirror; a plurality of electrodes associated with the mirror; and a plurality of mirror actuator circuits corresponding to the plurality of electrodes, the mirror actuator circuits adapted to provide a corresponding first signal to the corresponding electrodes to control a position of the mirror and further adapted to measure a corresponding capacitance between the corresponding electrodes and the mirror to provide a corresponding measured mirror position.

In accordance with another embodiment of the present invention, a method of determining a position of a mirror includes providing an electrostatic actuator adapted to control a position of the mirror; measuring a capacitance between the electrostatic actuator and the mirror; and converting the capacitance measured to a measured mirror position.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the present invention and their advantages are best understood by referring to the detailed description that follows. It should be appreciated that like reference numerals are used to identify like elements illustrated in one or more of the figures.

DETAILED DESCRIPTION

Figure 1:
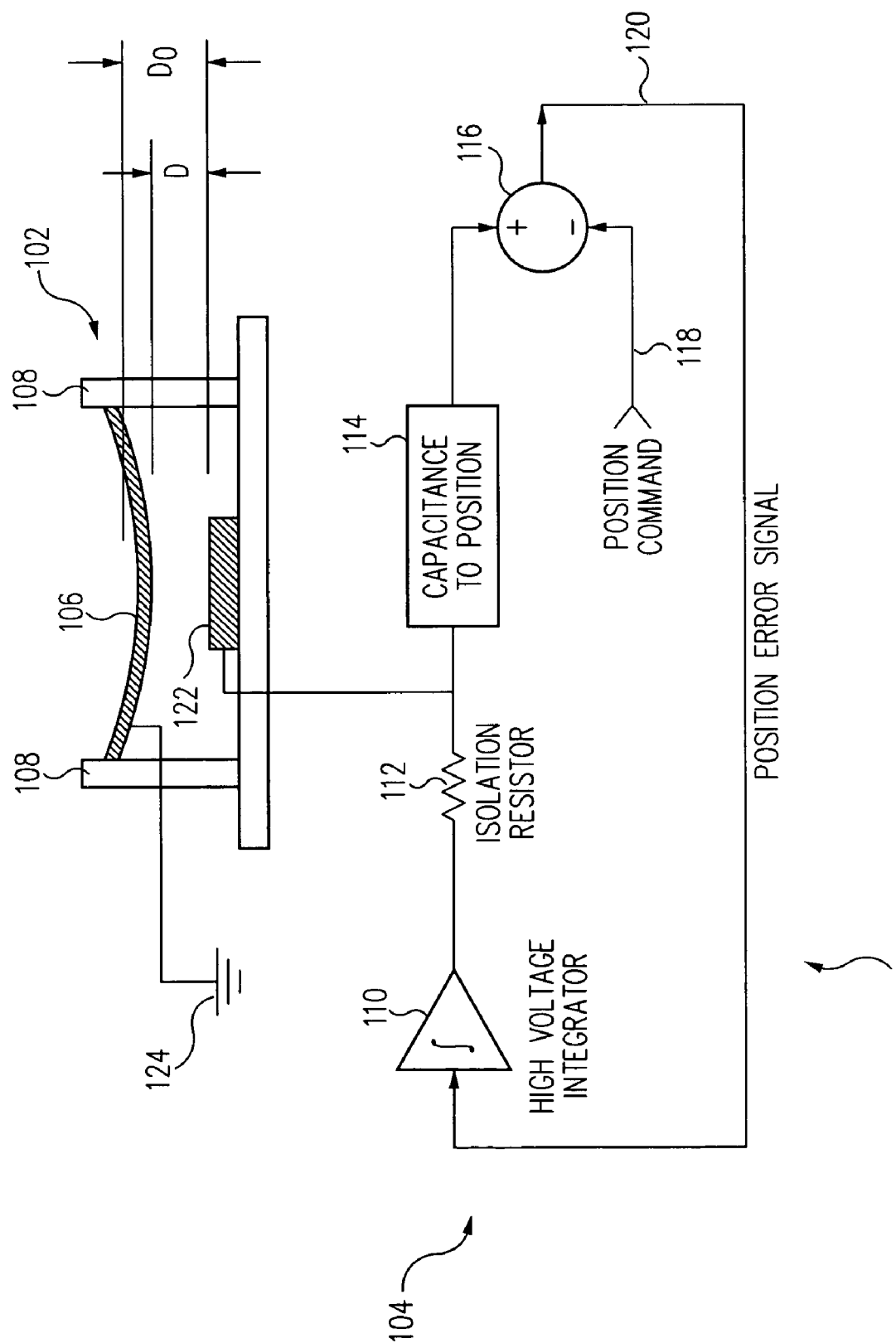
FIG. 1 shows a mirror system in accordance with an embodiment of the present invention.

FIG. 1 shows a mirror system 100 in accordance with an embodiment of the present invention. System 100 includes a mirror 102 and an actuator circuit 104. Mirror 102 (e.g., a MEMS mirror) includes a membrane 106 (e.g., a conductive and flexible membrane), which may be under tension and supported by support structures 108. Mirror 102 may represent, for example, a conventional MEMS mirror or MEMS mirror membrane as known in the art.

Actuator circuit 104 includes an integrator 110 (e.g., a high voltage integrator), a resistor 112, a capacitance measurement circuit 114, a difference circuit 116, and one or more electrodes 122. For this exemplary implementation and for clarity, only one electrode 122 is shown in FIG. 1. However, it should be understood that generally a number of electrodes 122 (e.g., an array of electrodes 122) are employed as known in the art, with actuator circuit 104 controlling all or a subset of electrodes 122 or one actuator circuit 104 corresponding to each electrode 122.

Membrane 106 is supported above electrodes 122 (e.g., an electrode array), which form and function as electrostatic actuators. Membrane 106 is common to electrodes 122 and may be referenced to a reference voltage 124 (e.g., electrical ground).

In terms of general operation, a high voltage (e.g., a high voltage bias) is provided by integrator 110 to electrode 122 via resistor 112, which functions at least partially as an isolation resistor. The high voltage results in an electrostatic force provided via electrode 122, which deflects membrane 106 based on the voltage level.

The force on membrane 106 provided by each electrode 122 (i.e., electrostatic actuator) may be as represented in equation (1):

$$F_{actuator} \propto \frac{\varepsilon_0 A V^2}{D^2} \quad (1)$$

where $\varepsilon_0$ is the dielectric constant, A is the area of the electrode, V is the applied voltage, and D is the distance between electrode 122 and membrane 106. The restoring force on membrane 106 may be as represented in equation (2):

$$F_{restore} \propto k(D-D_0) \quad (2)$$

where k is a "spring constant" for the tensioned membrane 106 and $D_0$ is the rest position of membrane 106 when no voltage is applied to electrode 122. $D_0$ and D are shown in an exemplary fashion in FIG. 1.

Figure 2:
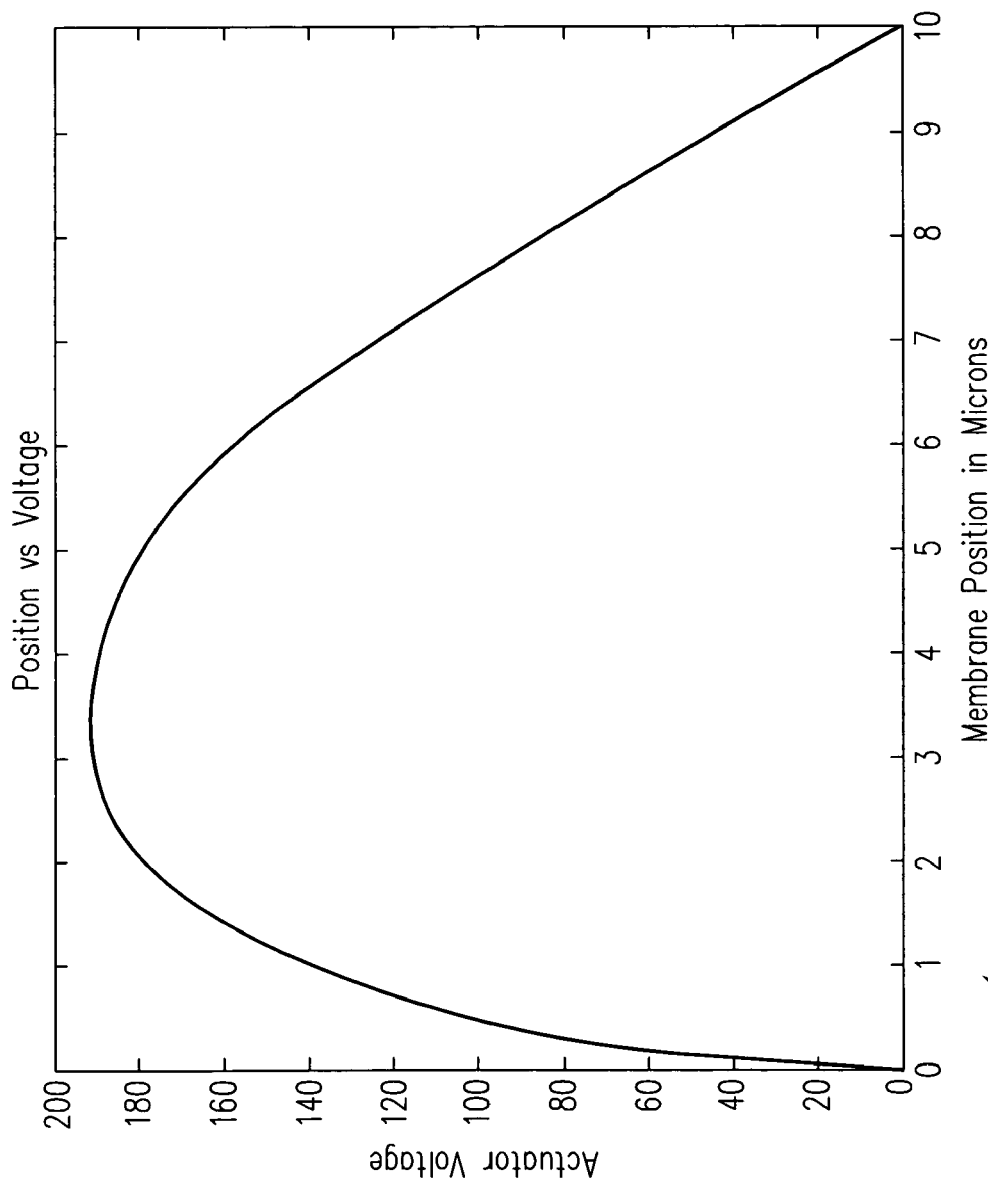
FIG. 2 shows an exemplary graph of mirror position in accordance with an embodiment of the present invention.

When a constant voltage is applied to electrode 122, the resulting position of membrane 106 is determined when the actuator force ($F_{actuator}$) of electrode 122 is balanced by the restoring force ($F_{restore}$) of membrane 106. For example, FIG. 2 shows an exemplary graph 200 of mirror position in accordance with an embodiment of the present invention. Specifically, graph 200 provides a plot of applied electrode voltage (labeled actuator voltage) versus membrane position. As illustrated in graph 200, a generally nonlinear relationship may exist between the applied electrode voltage and the membrane position for a typical MEMS mirror and actuator.

For example, with zero volts applied, the neutral or relaxed position of the mirror membrane (e.g., $D_0$ as shown in FIG. 1) is ten microns above the actuator electrode. As the voltage is increased, the electrostatic attraction pulls the mirror membrane closer to the electrode. Because of the nonlinear behavior of the actuator in this example, if the applied voltage exceeds approximately 190 volts, the electrostatic attraction force exceeds the restoring force and the mirror membrane will snap down.

Similarly, if the applied voltage is 180 volts, the mirror membrane is approximately five microns above the actuator electrode. If an external perturbing force momentarily pushes the mirror membrane closer to the actuator electrode (e.g., closer than two microns), again the electrostatic attraction force will exceed the restoring force and the mirror membrane will snap down. Consequently, it would be desirable to obtain an accurate measurement of the distance between the mirror membrane and the actuator electrode.

Returning to FIG. 1, capacitance measurement circuit 114 (e.g., a capacitance to position conversion circuit) of actuator circuit 104 is employed to measure a capacitance associated with electrode 122 and provide this measurement as a position measurement signal to difference circuit 116. Difference circuit 116 compares the position measurement signal (i.e., a measured actual mirror position) to a position command signal 118 (e.g., a desired mirror position command) and provides a position error signal 120 that is fed back to integrator 110.

For example, a capacitance of electrode 122 (actuator) may be as represented in equation (3).

$$C = \frac{\varepsilon_0 A}{D} \quad (3)$$

Because $\varepsilon_0$ and A are constants, the distance D can be calculated from the capacitance (C).

Consequently, in accordance with an embodiment of the present invention, capacitance measurement circuit 114 functions to measure a capacitance between electrode 122 and membrane 106 and provide an actual position measurement signal (e.g., position information for mirror membrane 106) to difference circuit 116 based on the measured capacitance. Resistor 112 may serve as an isolation resistance that allows the capacitance of electrode 122 to be measured with minimal contribution from any parasitic capacitance associated with integrator 110.

Difference circuit 116 compares the actual position measurement signal from capacitance measurement circuit 114 to position command signal 118, with the difference between these two signals provided as a position error signal 120 (i.e., a mirror position error). The position error signal 120 is integrated by integrator 110, with the resulting high voltage signal from integrator 110 applied to electrode 122 via resistor 112. Thus, a servo loop (e.g., a type 1 servo loop) may be formed which eventually drives membrane 106 to the desired position via electrode 122 based on information provided by capacitance measurement circuit 114.

As discussed herein in accordance with an embodiment of the present invention, there may be a number of electrodes 122 which may each be controlled by a corresponding actuator circuit 104. By measuring a position error of membrane 106 associated with each electrode 122, a position of membrane 106 may be accurately determined and positioned.

Capacitance measurement circuit 114 may be implemented in a number of different ways or methods (e.g., various types of circuit implementation techniques). For example, a charge amplifier circuit, a relaxation oscillator, or an impedance bridge may be utilized. A common characteristic of these types of circuits is that a small amplitude, high frequency signal is injected into the capacitance under test and the resulting current flow is then sensed. As described herein in reference to FIG. 3, membrane 106 of mirror 102 (e.g., a MEMS mirror) acts as a common plate for all of the individual electrodes 122, with membrane 106 receiving the small amplitude, high frequency signal (e.g., injected into a membrane plate of membrane 106).

Figure 3:
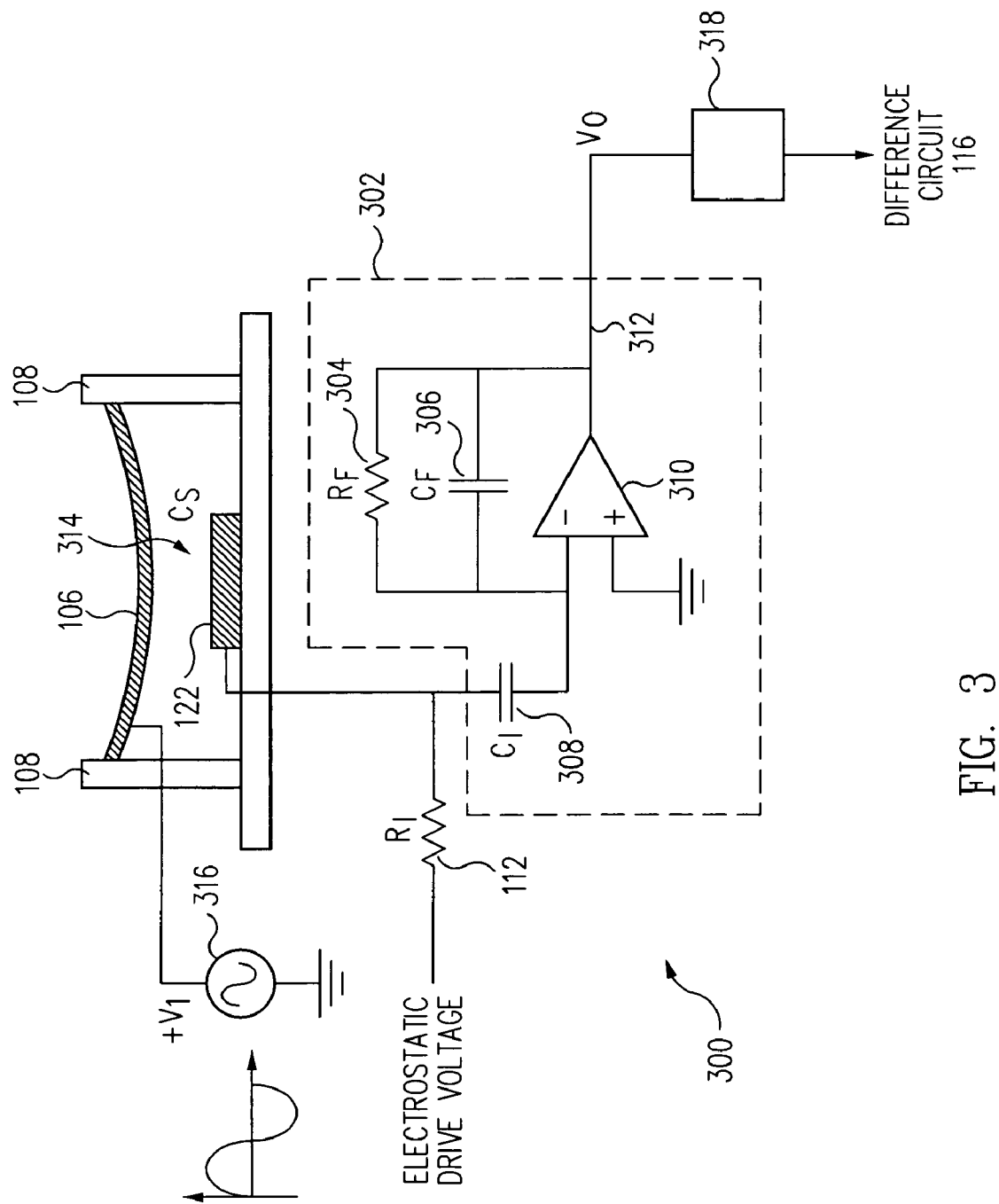
FIG. 3 shows an exemplary circuit implementation for a portion of the mirror system of FIG. 1 in accordance with an embodiment of the present invention.

For example, FIG. 3 shows a circuit 300, which shows a portion of mirror system 100 and includes a circuit 302 which is an exemplary circuit implementation for capacitance measurement circuit 114 of FIG. 1 in accordance with an embodiment of the present invention. Circuit 302 may be viewed as a charge amplifier circuit that provides capacitance to voltage conversion by utilizing a capacitive feedback loop. A voltage level on membrane 106 may be modulated with a voltage signal ($V_I$) 316. For example, voltage signal 316 may be a small amplitude, high frequency sinusoidal signal having a frequency (w), as illustrated in FIG. 3.

Circuit 302 includes a resistor ($R_F$) 304, a capacitor ($C_F$) 306 and a capacitor ($C_I$) 308, and an amplifier 310 (e.g., an operational amplifier). A capacitor ($C_S$) 314 may represent a capacitance between electrode 122 and membrane 106 or capacitance associated with electrode 122. A current (an alternating current (AC) due to voltage signal 316) may be coupled through capacitor 314 (e.g., also referred to as a position sensing capacitor) and passed to amplifier 310.

Resistor ($R_I$) 112 (e.g., an isolation resistor) prevents the AC current from being shunted by integrator 110 (e.g., a high voltage integrator or drive amplifier), which is coupled to resistor 112 (as shown in FIG. 1). Capacitor ($C_I$) 308 (e.g., an isolation capacitor) prevents the electrostatic drive voltage provided by integrator 110 from coupling into amplifier 310 (or biasing a result from amplifier 310).

Capacitor ($C_F$) 306 (e.g., a feedback capacitor) converts the AC (capacitive) current from capacitor ($C_S$) 314 to provide a voltage signal ($V_O$) 312, which is proportional to the actual capacitance value of capacitor ($C_S$) 314. For example, if resistor ($R_F$) 304 (e.g., a feedback resistor) is chosen such that $wR_F C_F \gg 1$, capacitor ($C_I$) 308 is chosen such that $C_I \gg C_F$, and resistor ($R_I$) 112 is chosen such that $wR_I C_S \gg 1$, then an output voltage level of voltage signal 316 may be as represented in equation (4). As illustrated by this equation, the voltage response is a linear function of a sensor capacitance represented by capacitor 314.

$$V_O = -\frac{C_S}{C_F} \times V_I \quad (4)$$

In general, capacitance measurement circuit 114 (e.g., capacitance to position block) illustrated in FIG. 1 performs the function of measuring the value of a capacitance between membrane 106 and electrode 122 (e.g., an actuator or drive electrode). It should be understood that there are many known techniques by those skilled in the art for performing a capacitance measuring operation.

Circuit 302 may represent an exemplary circuit implementation for a charge amplifier circuit for capacitance measurement circuit 114, which would be incorporated into a MEMS mirror actuator position sensor (e.g., as shown for actuator circuit 104 of FIG. 1). Voltage signal 312 may be demodulated to produce a voltage signal proportional to the measured capacitance. This voltage signal may then be provided to difference circuit 116 directly, or further processing (e.g., by an optional compensation block 318 as shown in FIG. 3) of voltage signal 312 may occur before providing a result to difference circuit 116.

As noted above, various methods exist for demodulating an AC voltage to produce a signal representative of a capacitance value. Similarly, various methods exist for calculating and compensating for a non-linear relationship. For example, voltage signal 312 may be processed by compensation block 318, which may represent various known methods, to provide non-linearity compensation, such as for a non-linear relationship of capacitance (capacitor 314) versus membrane position (membrane 106). These methods allow for the generation of a linear signal representative of a position of membrane 106 for use by actuator circuit 104 (e.g., a closed-loop position controller).

As an example, one possible method of performing the linearization of the position signal (e.g., represented by voltage signal 312) is to utilize an analog-to-digital (A/D) converter to digitize the position signal. The digitized position signal may be utilized to address a memory (e.g., a read only memory) that is programmed with the linearized position values for membrane 106 versus capacitance of capacitor 314 (sensor capacitance). The output value from the memory may be passed through a digital-to-analog (D/A) converter to provide an analog signal to difference circuit 116 (e.g., to be utilized by an analog servo loop). Alternatively, the output value from the memory (e.g., digital output) may be utilized by a digital signal processor (DSP) to perform the same servo loop function in the digital domain. As an example for either method selected, servo loop tuning for various parameters, such as nonlinear aspects and actuator cross-coupling effects, if any may also be performed.

In accordance with an embodiment of the present invention, capacitance associated with an actuator is utilized to directly sense mirror position (e.g., electronically rather than optically). Thus, the problems associated with conventional optical feedback methods may be eliminated and closed loop operation of the MEMS mirror may be performed without the need for any feedback optics. Furthermore, the MEMS mirror may be operated at or near its fullest capability, while preventing or reducing snap down events (e.g., by incorporating hard limits in the position servo loop).

For example, in accordance with an embodiment of the present invention, a mirror membrane position may be determined from the capacitance of the electrostatic actuator. The measurement of the capacitance can therefore be used as the position feedback signal for a servo control system driving the mirror membrane position. This may be viewed as an all electronic solution to MEMS mirror control, with the position feedback system incorporated into the mirror electronics (i.e., mirror actuator circuit).

One or more embodiments of the present invention may be utilized as or complement many of the wavefront correction systems (or optical corrections systems) currently employed, such as for example for laser applications involving defense or tactical lasers to medical laser applications to telescopes and other optical devices or adaptive optic systems. By implementing one or more techniques discussed herein, methods for sensing the capacitance may have high bandwidth and low latency, which may provide good servo loop control of the mirror.

Embodiments described above illustrate but do not limit the invention. It should also be understood that numerous modifications and variations are possible in accordance with the principles of the present invention. Accordingly, the scope of the invention is defined only by the following claims.

I claim:

1. A mirror system comprising:
a mirror;
a mirror actuator circuit having an electrode to control a position of the mirror, wherein a capacitance between the electrode and the mirror is measured to determine a position of the mirror, and wherein the mirror actuator circuit comprises:
an amplifier circuit adapted to provide a first voltage signal to the electrode to provide an electrostatic force to control the position of the mirror;
a measurement circuit adapted to measure the capacitance between the electrode and the mirror and provide a measured mirror position signal;

a difference circuit adapted to receive a mirror position command and the measured mirror position signal and provide a mirror position error signal to the amplifier circuit; and a memory adapted to store linearized values to provide to the difference circuit based on the measured mirror position signal to compensate for non-linear relationships.

2. The mirror system of claim 1, wherein the mirror is a micro-electro-mechanical system mirror membrane.

3. The mirror system of claim 1, wherein the capacitance measured is converted to the mirror position error signal to control a position of the mirror.

4. The mirror system of claim 1, wherein the mirror actuator circuit further comprises a resistor coupled between the amplifier circuit and the measurement circuit.

5. The mirror system of claim 1, wherein the measurement circuit comprises a charge amplifier circuit, a relaxation oscillator, or an impedance bridge.

6. The mirror system of claim 1, wherein the measurement circuit further comprises a high frequency signal generator adapted to provide a high frequency signal to the mirror.

7. The mirror system of claim 1, wherein the mirror system further comprises a plurality of the mirrors and corresponding ones of the mirror actuator circuits, the electrodes forming an electrode array for the mirror.

8. The mirror system of claim 1, wherein the mirror system is incorporated as pan of an adaptive optic system or an optical correction system.

9. A mirror actuator system comprising:
a mirror;
a plurality of electrodes associated with the mirror; and
a plurality of mirror actuator circuits corresponding to the plurality of electrodes, the mirror actuator circuits adapted to provide a corresponding first signal to the corresponding electrodes to control a position of the mirror and further adapted to measure a corresponding capacitance between the corresponding electrodes and the mirror to provide a corresponding measured mirror position; wherein the mirror actuator circuits each comprises:
an amplifier adapted to provide a high voltage signal to the electrode to generate an electrostatic force to act on the mirror;
a capacitance measurement circuit adapted to measure the capacitance between the electrode and the mirror and provide a measured mirror position signal;
an isolation capacitor adapted to isolate the amplifier from the capacitance measurement circuit; and
a feedback circuit adapted to compare the measured mirror position signal and a mirror position command and provide a mirror position error signal to the amplifier.

10. The mirror actuator system of claim 9, wherein the measured mirror positions provide feedback to correct for corresponding position errors of the mirror.

11. The mirror actuator system of claim 9, wherein the measured mirror positions are compensated for a non-linear relationship between the capacitance and the corresponding measured mirror position.

12. The mirror actuator system of claim 9, wherein the capacitance measurement circuit comprises a charge amplifier circuit, a relaxation oscillator, or an impedance bridge.

13. The mirror actuator system of claim 9, wherein the feedback circuit is further adapted to compensate for a non-linear relationship between the capacitance measured and the measured mirror position signal.

14. The mirror actuator system of claim 9, wherein the mirror actuator system further comprises a signal generator adapted to generate a signal on the mirror to facilitate the capacitance to be measured between each of the electrodes and the mirror.

15. The mirror actuator system of claim 9, wherein the mirror actuator system is formed as part of an adaptive optic system or an optical correction system.

16. A method of determining a position of a mirror, the method comprising:
providing an electrostatic actuator adapted to control a position of the mirror;
providing a drive signal to the electrostatic actuator to control the position of the mirror;
measuring a capacitance between the electrostatic actuator and the mirror;
isolating the providing of the drive signal from the measuring of the capacitance;
converting the capacitance measured to a measured mirror position;
comparing the measured mirror position to a commanded mirror position to generate a position error;
providing the position error as a feedback signal for the providing of the drive signal to correct the position error of the mirror; and
storing linearized values to compensate the measured mirror position for a non-linear relationship between the capacitance measured and the measured mirror position.

17. The method of claim 16, wherein the measuring of the capacitance further comprises providing an alternating current signal on the mirror for the measuring of the capacitance.

18. The method of claim 16, further comprising compensating the position error for a non-linear relationship between the capacitance measured and the measured mirror position.

19. The method of claim 16, wherein the electrostatic actuator controls an electrostatic force acting on the mirror.

20. The method of claim 16, wherein the providing of the drive signal occurs approximately simultaneously with the measuring of the capacitance.

* * * * *